US012801573B2

(12) United States Patent
Tian et al.

(10) Patent No.: US 12,801,573 B2
(45) Date of Patent: Nov. 17, 2026

(54) METHODS FOR COMPRESSING AND DECOMPRESSING MULTIDIMENSIONAL DATA

(71) Applicant: Hong Kong Applied Science and Technology Research Institute Company Limited, Hong Kong (HK)

(72) Inventors: Meijing Tian, Hong Kong (HK); Ting Hei Wan, Hong Kong (HK); Yuan Zhao, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 153 days.

(21) Appl. No.: 18/777,611

(22) Filed: Jul. 19, 2024

(65) Prior Publication Data

US 2026/0023720 A1 Jan. 22, 2026

(51) Int. Cl.
*G06F 16/174* (2019.01)

(52) U.S. Cl.
CPC ................................ *G06F 16/1744* (2019.01)

(58) Field of Classification Search
CPC .................................................. G06F 16/1744
See application file for complete search history.

(56) References Cited

U.S. PATENT DOCUMENTS 7,003,039 B2 * 2/2006 Zakhor .................. H04N 19/30 382/253
7,551,785 B2 * 6/2009 Qian ....................... G06T 9/008 375/240

(Continued)

FOREIGN PATENT DOCUMENTS

CN 102088606 A 6/2011
CN 102496143 A 6/2012

(Continued)

OTHER PUBLICATIONS

Agnihotri et al., "Lossless Image Compression Using Multi-level Dictionaries: Binary Images", Jun. 5, 2024, arXiv:2406.03087v1 [cs.IT] (Year: 2024).*

(Continued)

*Primary Examiner* — Syed H Hasan
*Assistant Examiner* — Robert F May
(74) *Attorney, Agent, or Firm* — IDEA Intellectual Limited; Sam T. Yip

(57) ABSTRACT

A method is provided for compressing multidimensional data having a plurality of data point into a compressed file. The method comprises: generating a plurality of super pixels from the multidimensional data; clustering the plurality of super pixels into a plurality of super pixel clusters; using the plurality of super pixel clusters to train a plurality of dictionaries respectively; splitting the multidimensional data into a plurality of data sub-blocks; vectorizing the plurality of data sub-blocks to obtain a plurality of vectorized data sub-blocks; selecting a dictionary for each of the vectorized data sub-blocks; sparse coding each of vectorized data sub-blocks with a corresponding selected dictionary to obtain a compressed representation; and storing the obtained compressed representations and indexes of corresponding selected dictionaries in the compressed file.

9 Claims, 8 Drawing Sheets

(56) References Cited

U.S. PATENT DOCUMENTS

| | | | | |
|---|---|---|---|---|
| 8,433,148 | B2 * | 4/2013 | Porikli | H04N 19/85 382/277 |
| 10,454,496 | B1 * | 10/2019 | Prieditis | G06N 20/00 |
| 2013/0159263 | A1 * | 6/2013 | Paffenroth | H04N 19/90 707/693 |
| 2014/0037199 | A1 * | 2/2014 | Aharon | H04N 19/97 382/159 |
| 2015/0287223 | A1 * | 10/2015 | Bresler | G06T 12/20 382/131 |
| 2016/0335224 | A1 * | 11/2016 | Wohlberg | H03M 7/00 |
| 2017/0213109 | A1 * | 7/2017 | Moody | H03M 7/3084 |
| 2018/0165809 | A1 * | 6/2018 | Stanitsas | G06T 5/40 |
| 2019/0138420 | A1 * | 5/2019 | Harutyunyan | G06F 11/301 |
| 2020/0019817 | A1 * | 1/2020 | Lin | G06V 10/7715 |
| 2020/0083902 | A1 * | 3/2020 | Martens | H03M 7/30 |
| 2025/0245117 | A1 * | 7/2025 | Rolo | G06F 11/3082 |

FOREIGN PATENT DOCUMENTS

| | | | | |
|---|---|---|---|---|
| CN | 102891999 A | | 1/2013 | |
| CN | 103489203 A | | 1/2014 | |
| CN | 105118049 A | | 12/2015 | |
| CN | 106296611 A | | 1/2017 | |
| CN | 106934398 A | | 7/2017 | |
| CN | 106658003 B | | 4/2018 | |
| CN | 116320042 A | * | 6/2023 | H04L 69/04 |
| WO | 2022001159 A1 | | 1/2022 | |

OTHER PUBLICATIONS

Farshad G. Veshki et al., “A Fast Dictionary Learning Method for Coupled Feature Space Learning”, IEEE Signal Processing Letters, Institute of Electrical and Electronics Engineers, Apr. 2019.
Ori Bryt et al., “Compression of facial images using the K-SVD algorithm”, Journal of Visual Communication and Image Representation, Elsevier, May 2008, vol. 19, Iss. 4, pp. 270-282.
Guangqi Shao et al., “Fingerprint Compression Based on Sparse Representation”, IEEE Transactions on Image Processing, Institute of Electrical and Electronics Engineers, Feb. 2014, vol. 23, No. 2, pp. 489-501.
Ron Rubinstein et al., “Efficient Implementation of the K-SVD Algorithm using Batch Orthogonal Matching Pursuit”, Technion—Computer Science Department, 2008.
Hufei Zhu et al., “Efficient Implementations for Orthogonal Matching Pursuit”, Electronics, MDPI, Sep. 2020, vol. 9, Iss. 9, No. 1507.
International Search Report and Written Opinion of corresponding PCT application No. PCT/CN2024/107956 mailed on Apr. 16, 2025.

* cited by examiner

METHODS FOR COMPRESSING AND DECOMPRESSING MULTIDIMENSIONAL DATA

TECHNICAL FIELD

The present invention generally relates to multidimensional data compression, more particularly, relates to a multidimensional data compression using dictionary learning based on sparse representation.

BACKGROUND

In recent years, cameras, light detection and ranging (LIDAR), inertial measurement unit (IMU), and other sensors are widely used to generate a large amount of multidimensional data for describing complex phenomena or systems and capturing relationships and interactions across different dimensions. Since multidimensional data requires high accuracy for further inspection and measurement tasks, the amount of multidimensional data is very large. In addition, the multidimensional data may need to be saved for a long time and take up a large part of the memory.

Dictionary learning based on sparse representation has been applied for data compression in various applications such as image and video compression, medical imaging, and signal processing that aims to efficiently represent signals or data using a sparse set of basic elements. Dictionary learning allows for the adaptation of dictionaries to better suit the characteristics of the data being compressed. This adaptive nature enables more effective representation of complex signals by learning a dictionary that captures the essential features of the data in a sparse manner. By promoting sparsity, dictionary learning compression techniques based on sparse representation facilitate more efficient storage and transmission of data while preserving important information, making them valuable. However, most existing dictionary-learning approaches are designed to learn training samples in a series manner that requires a long computation time.

SUMMARY OF INVENTION

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to performing compression on different forms of multidimensional data, reconstruction of the compressed data with high quality, high compression ratio for saving memory usage, and fast compression speed. Therefore, a multidimensional data compression mechanism for compressing multidimensional data based on super pixels, trained dictionaries, and sparse coding; and a data reconstruction mechanism for reconstructing multidimensional data with high quality are provided by the present invention.

In one aspect of the present invention, a method for compressing multidimensional data having a plurality of data point into a compressed file is provided. The method comprises: generating a plurality of super pixels from the multidimensional data; clustering the plurality of super pixels into a plurality of super pixel clusters; using the plurality of super pixel clusters to train a plurality of dictionaries respectively; splitting the multidimensional data into a plurality of data sub-blocks; vectorizing the plurality of data sub-blocks to obtain a plurality of vectorized data sub-blocks; selecting a dictionary for each of the vectorized data sub-blocks; sparse coding each of vectorized data sub-blocks with a corresponding selected dictionary to obtain a compressed representation; and storing the obtained compressed representations and indexes of corresponding selected dictionaries in the compressed file. Each dictionary is selected for a corresponding vectorized data sub-block by: calculating a similarity between the corresponding vectorized data sub-block and each of the super pixel clusters; finding a best-matched super pixel cluster having a highest similarity with the vectorized data sub-block; selecting a dictionary trained with the best-matched super pixel cluster as the coding dictionary. Each dictionary is trained with a corresponding super pixel cluster by: dividing the corresponding super pixel cluster into a plurality of training data sub-blocks; vectorizing the plurality of training data sub-blocks to obtain a plurality of initial representations respectively, calculating a similarity matrix between each pair of training data sub-blocks; computing an average similarity value for each training data sub-block; selecting a plurality of initial training data sub-blocks from the plurality of training data sub-blocks based on the computed average similarity values; initializing the dictionary by setting the initial training data sub-blocks as initial atoms of the dictionary; training the dictionary to construct a sparse coding representation for each of the training data sub-blocks by performing a batch orthogonal matching pursuit (batch OMP) algorithm constrained with a target sparsity and a target residual threshold; and updating the dictionary atom by atom with the constructed sparse coding representations to obtain a trained dictionary.

In another aspect of the present invention, a method for decompressing multidimensional data from a compressed file obtained by the method of the first aspect. The method comprises: decoding the plurality of compressed representations to obtain a plurality of decompressed data sub-blocks; and joining the plurality of decompressed data sub-blocks to reconstruct the multidimensional data. Each decompressed data sub-block is obtained by: retrieving a corresponding dictionary based on a corresponding index: multiplying the compressed representations with the retrieved dictionary to reconstruct a vectorized data sub-block; and de-vectorizing the reconstructed vectorized data sub-block to obtain the decompressed data sub-block.

It is noteworthy that, although description provided herein may be in the context of certain data processing technologies for compressing multidimensional data with high quality based on sparse representation, other data processing technologies using algorithms such as orthogonal matching pursuit, batch orthogonal matching pursuit, simple linear iterative clustering, Laplacian sparse subspace clustering, and the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF DRAWINGS

Embodiments of the invention are described in more details hereinafter with reference to the drawings, in which.

DETAILED DESCRIPTION OF THE INVENTION

In the following description, methods for compressing and decompressing multi-dimensional data and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
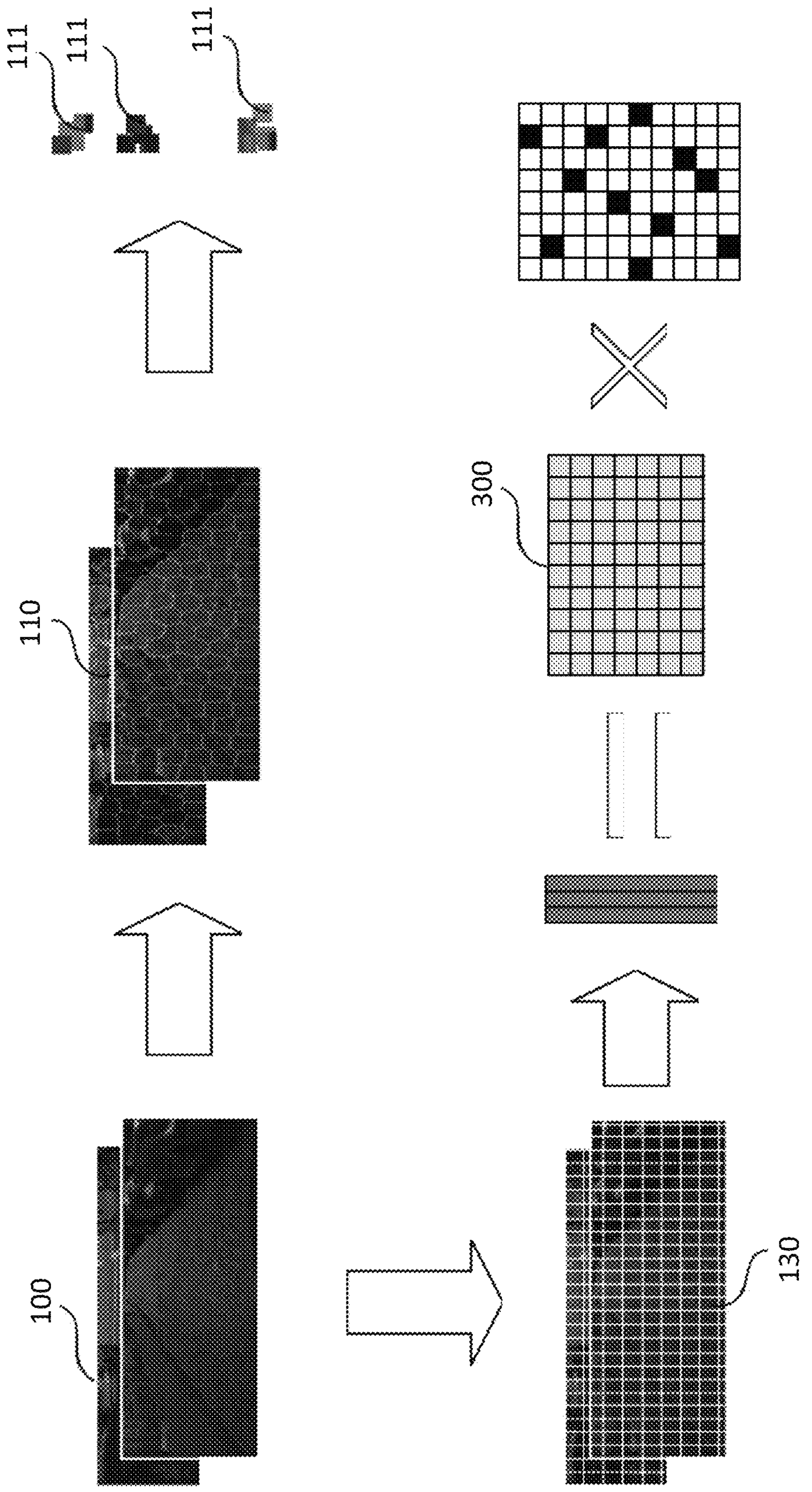
FIG. 1 depicts an example scenario of multidimensional data compression procedure in accordance with one embodiment of the present disclosure.
Figure 2:
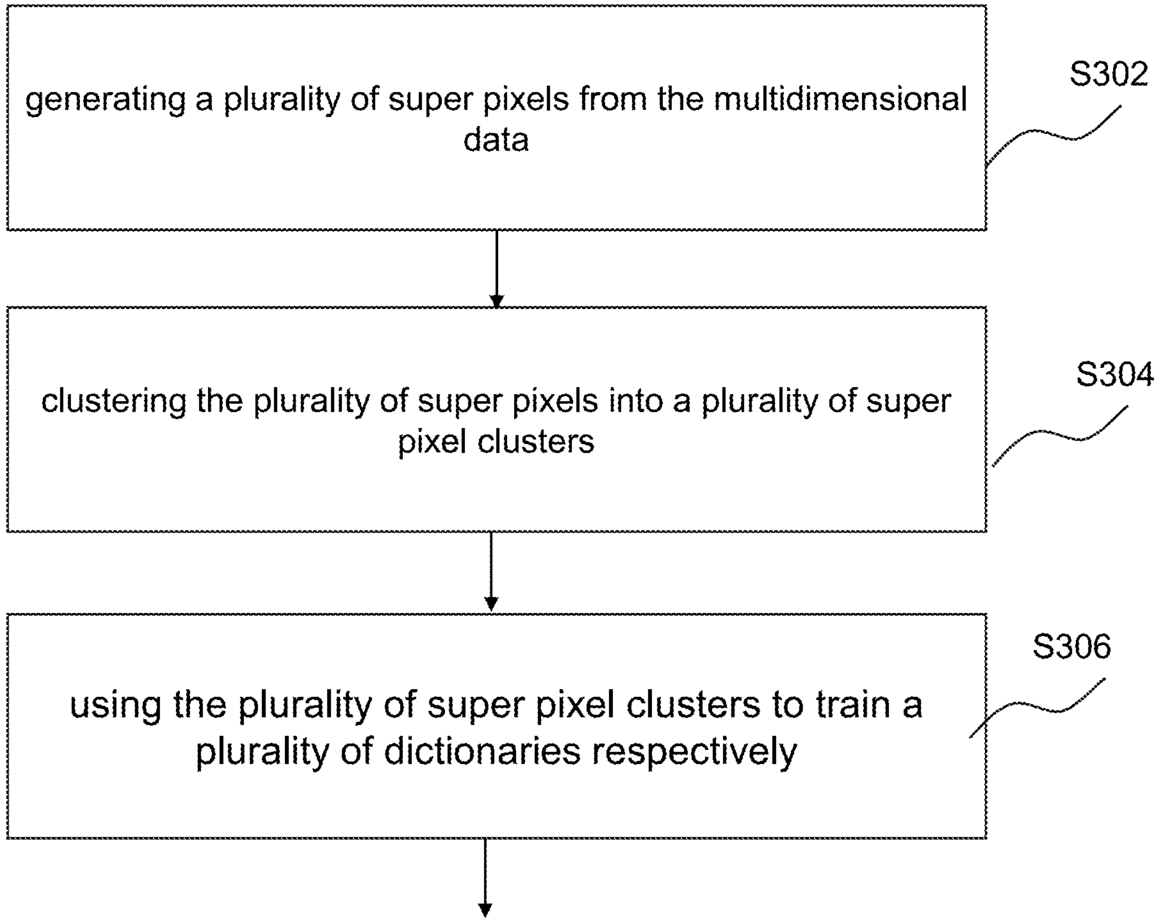
FIG. 2 is a flow chart of method for compressing multidimensional data in accordance with one embodiment of the present disclosure.
Figure 3:
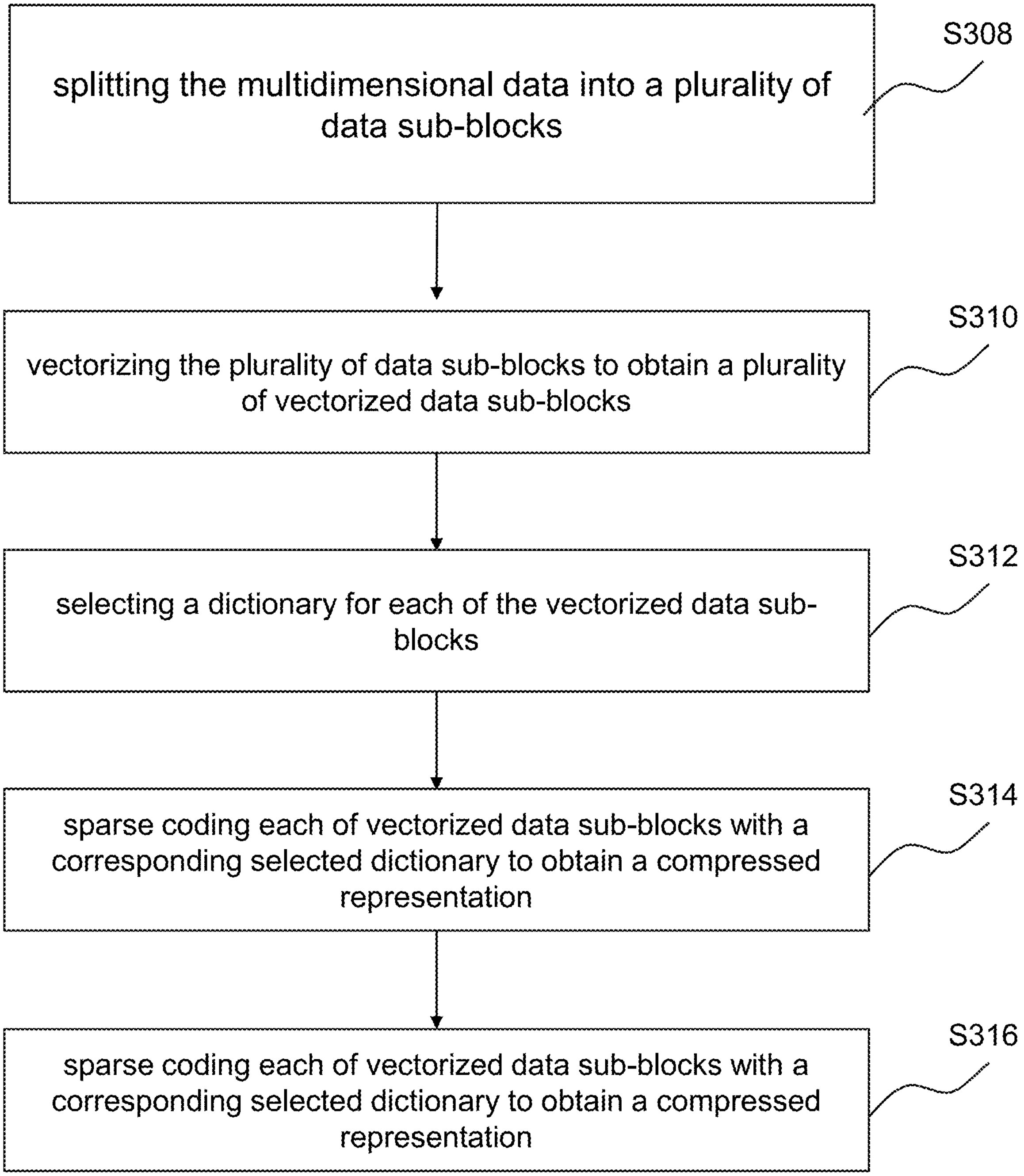
FIG. 3 is a continued flow chart of method for compressing multidimensional data in accordance with one embodiment of the present disclosure.

Reference is made to FIG. 1 which depicts an example scenario of multidimensional data compression. The multidimensional data 100 includes a plurality of multi-dimensional data points (not shown). The method for compressing multidimensional data 100 includes steps S302-S306 as shown in FIG. 2 and steps S308-S316 in FIG. 3. In details, the method for compressing multidimensional data 100 includes generating a plurality of super pixels 110 from the multidimensional data (e.g., image) 100, clustering the plurality of super pixels 110 into a plurality of super pixel clusters 111, using the plurality of super pixel clusters 111 to train a plurality of dictionaries 300 respectively.

The method for compressing multidimensional data 100 further includes splitting the multidimensional data 100 into a plurality of data sub-blocks (e.g., image patches) 130, vectorizing the plurality of data sub-blocks 130 to obtain a plurality of vectorized data sub-blocks, selecting a dictionary for each of the vectorized data sub-blocks, sparse coding each of vectorized data sub-blocks with a corresponding selected dictionary to obtain a compressed representation, and storing the obtained compressed representations and indexes of corresponding selected dictionaries in the compressed file.

The coding dictionary is selected for the corresponding vectorized data sub-block by calculating a similarity between the corresponding vectorized data sub-block and each of the super pixel clusters, finding a best-matched super pixel cluster having a highest similarity with the vectorized data sub-block, and selecting the dictionary trained with the best-matched super pixel cluster as the coding dictionary.

Specifically, the super pixels 110 may be generated using one of Simple Linear Iterative Clustering (SLIC) algorithm, Felzenszwalb super pixel segmentation, Simple Linear Iterative Clustering Over-segmentation (SLICO) algorithm, TurboPixels algorithm, and Quick-Shift algorithm, but not limited thereto Herein takes SLIC algorithm as an exemplary implementation for generating the super pixels 110. SLIC algorithm is a segmentation algorithm designed to partition an data sub-block into compact regions that exhibit similarity in color and texture.

Figure 4:
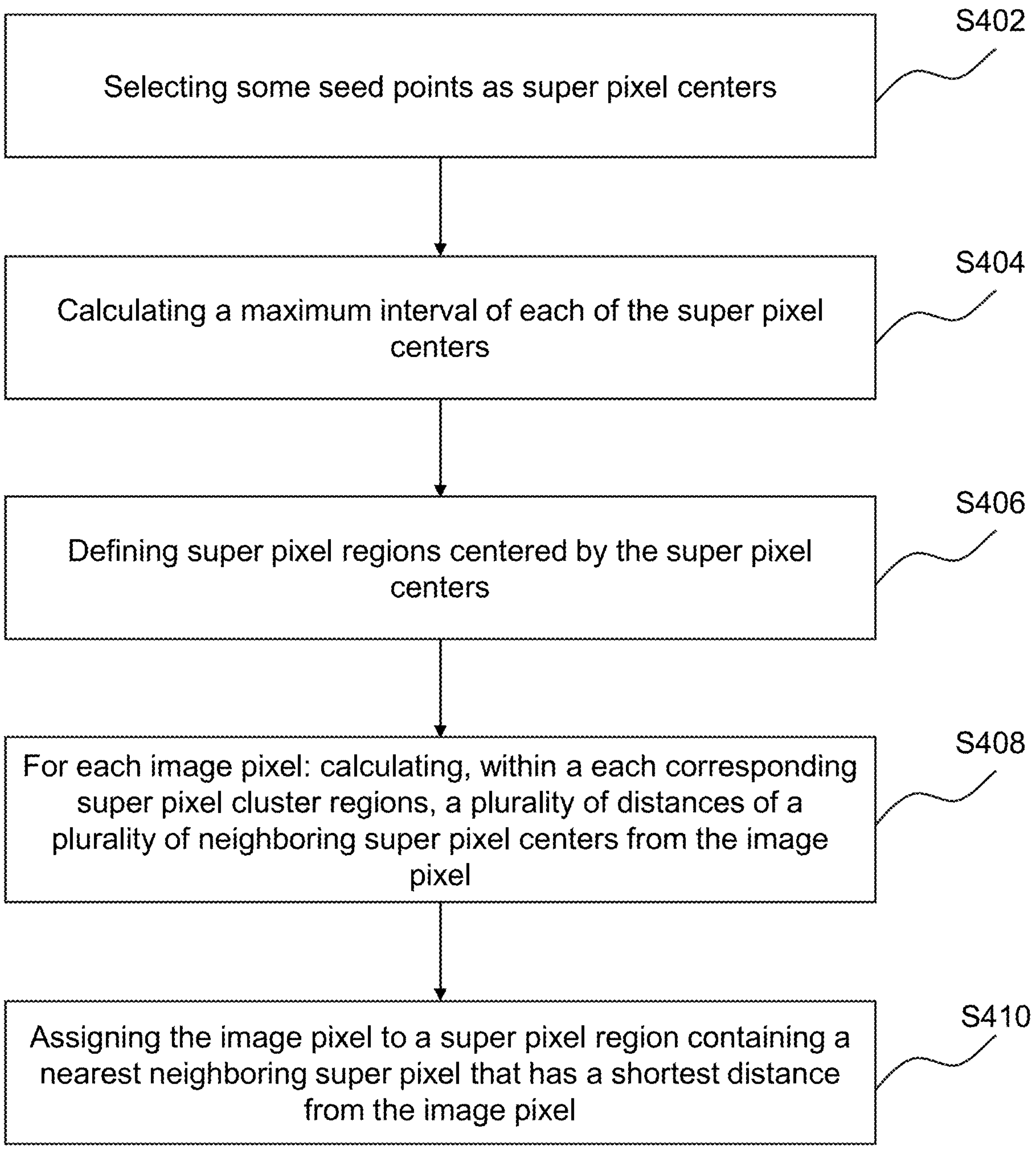
FIG. 4 is a flow chart of super pixel generation in accordance with one embodiment of the present disclosure.

Please refer to FIG. 4 for detailed steps S402-S410 of SLIC algorithm procedure. At the beginning of performing SLIC algorithm, some seed points are selected as initial super pixel centers 111. These seed points can be obtained according to a regular grid or based on color gradients of multidimensional data 100.

Then, a plurality of overlapped super pixel regions centered by and corresponding to the plurality of super pixel centers are defined respectively. Each overlapped super pixel region has a size equal to two times of the maximum interval S of the super pixel centers. The maximum interval S can be calculated as $$S = \sqrt{\frac{N}{K}},$$

wherein N denotes an area of the multi-dimensional data 100, and K denotes the number of the super pixel centers 111.

In order to assign each multi-dimensional data point to corresponding super pixel region and update a current location of each super pixel center 111, a distance of the data point from each of the neighboring super pixels is calculated, the neighboring super pixels can be defined as those super pixels within overlapped super pixel regions including the multi-dimensional data points. As the super pixel region are overlapped cut, each multi-dimensional data point can be located within more than one super pixel regions.

Based on the calculated distances, the multi-dimensional data point may be assigned to a super pixel region containing a nearest neighboring super pixel that has the shortest distance to the data point.

In one embodiment, the distance D between each of the super pixel centers 111 can be obtained by $$D = \sqrt{d_c^2 + \left(\frac{d_s}{s}\right)^2 m^2}.$$

wherein $d_c=\sqrt{(l_j-l_i)^2+(a_j-a_i)^2+(b_j-b_i)^2}$, denotes color distance of two color $(l_i, a_i, b_i)$ and $(l_i, a_j, b_j)$ in the multidimensional data 100; $d_s=\sqrt{(x_j-x_i)^2+(y_j-y_i)^2+(z_j-z_i)^2}$, denotes spatial distance of two spatial position of two data points $(x_i, y_i, z_i)$ and $(x_j, y_j, z_j)$ in the multidimensional data 100; and m denotes a constant which typically used to balance the influence of color distance and spatial distance.

By adjusting the constant m, the formation process of super pixels 110 can be fine-tuned according to the specific characteristics and requirements of the multidimensional data, thereby achieving better super pixel segmentation results.

Figure 5:
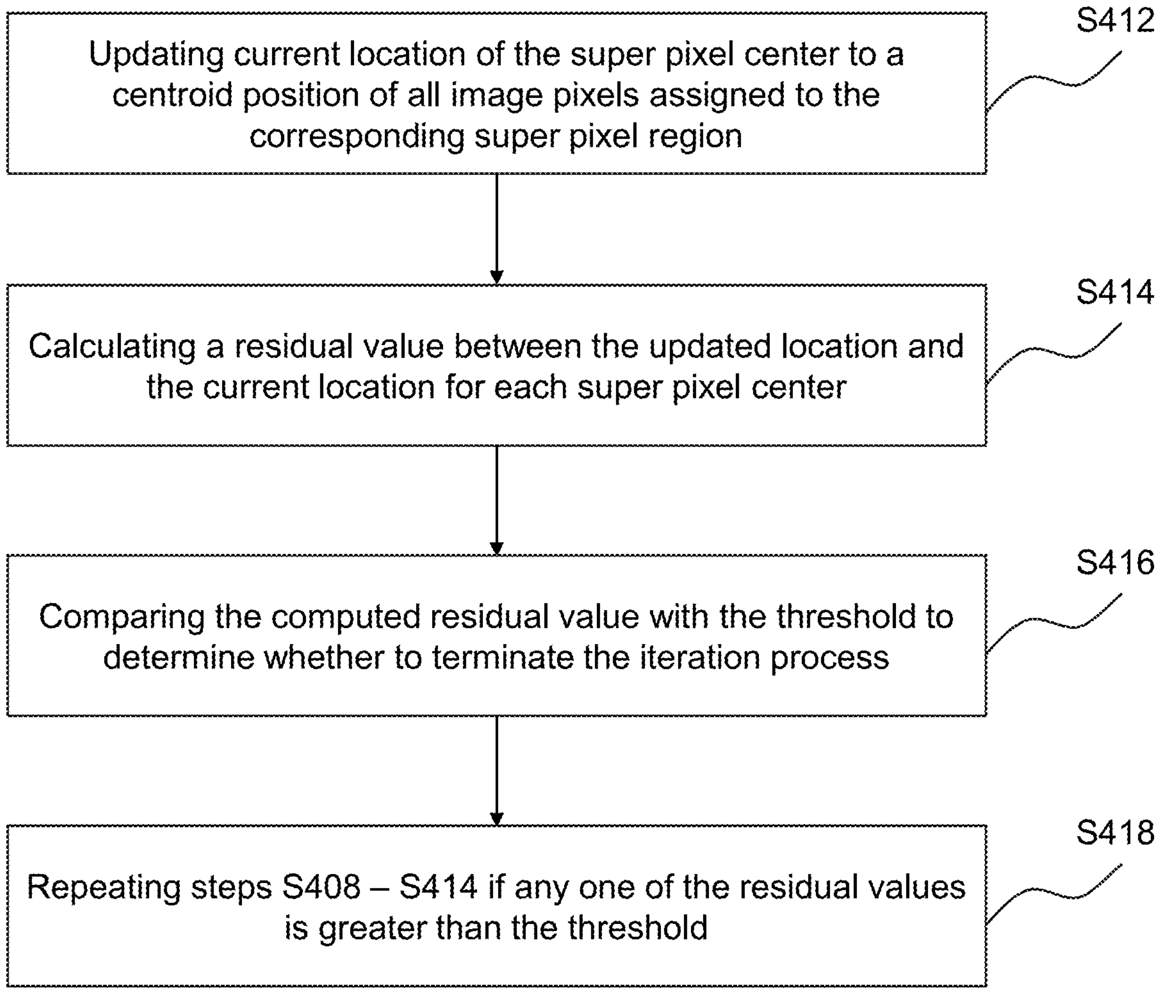
FIG. 5 is a continued flow chart of super pixel generation in accordance with one embodiment of the present disclosure.

Referring to FIG. 5 for the next steps S412-S418, assigning each multi-dimensional data point to the nearest super pixel center based on its color and spatial distances. To be more specific, a distance between each multi-dimensional data point and each super pixel center are calculated. Then, each of the multi-dimensional data point is assigned to the nearest super pixel center. This means that each multi-dimensional data point is classified as belonging to the super pixel region whose super pixel center 111 is closest to.

A current location of each of the super pixel centers 111 are updated to a centroid position of all multi-dimensional data points assigned to the corresponding super pixel region. Then, a residual value between the updated location and the current location for each super pixel center 111 is calculated. The residual value is usually calculated using the Euclidean distance or another distance metric to measure the change in position of the super pixel centers 111 between two iterations. Specifically, for each super pixel center i, the residual value between two iterations can be calculated as:

$$\text{residual}_i = \sqrt{\left(x_i^{(t)} - x_i^{(t-1)}\right)^2 + \left(y_i^{(t)} - y_i^{(t-1)}\right)^2 + \left(z_i^{(t)} - z_i^{(t-1)}\right)^2},$$

wherein $$\left(x_i^{(t)}, y_i^{(t)}, z_i^{(t)}\right) \text{ and } \left(x_i^{(t-1)}, y_i^{(t-1)}, z_i^{(t-1)}\right)$$

denote the locations of the super pixel center i at iterations t and t−1 respectively.

The threshold is used to determine whether to terminate the iteration process. Typically, the threshold is set to a very small value, such as 0.1 or 0.01, to ensure that the iteration stops when the change in position of the super pixel centers 111 is sufficiently small. By comparing the computed residual value with the threshold, it can be determined whether the algorithm has converged. If the residual value is smaller than the threshold, it can be concluded that the algorithm has converged and no further iterations are necessary.

The purpose of computing the residual value in the algorithm is to monitor the convergence of the algorithm. By examining the movement of the super pixel centers 111 during the iteration process, it is possible to determine whether the algorithm has converged, thereby avoiding unnecessary iterations and improving the efficiency of the algorithm.

The super pixels 110 may be clustered by performing one of the clustering algorithms such as Laplacian sparse subspace clustering (LSSC) algorithm, K-means clustering algorithm, Spectral clustering algorithm, Hierarchical clustering algorithm, Density-based clustering algorithm, and Agglomerative clustering algorithm, but not limited thereto. Herein takes LSSC algorithm as an exemplary implementation for clustering the super pixels 110. LSSC algorithm is an efficient and effective method for subspace clustering in high-dimensional data. It is designed to handle data that lie approximately in low-dimensional subspaces within a high-dimensional ambient space. LSSC algorithm leverages the sparsity assumption of data points within subspaces and utilizes the graph Laplacian to capture the intrinsic structure of the data.

Figure 6:
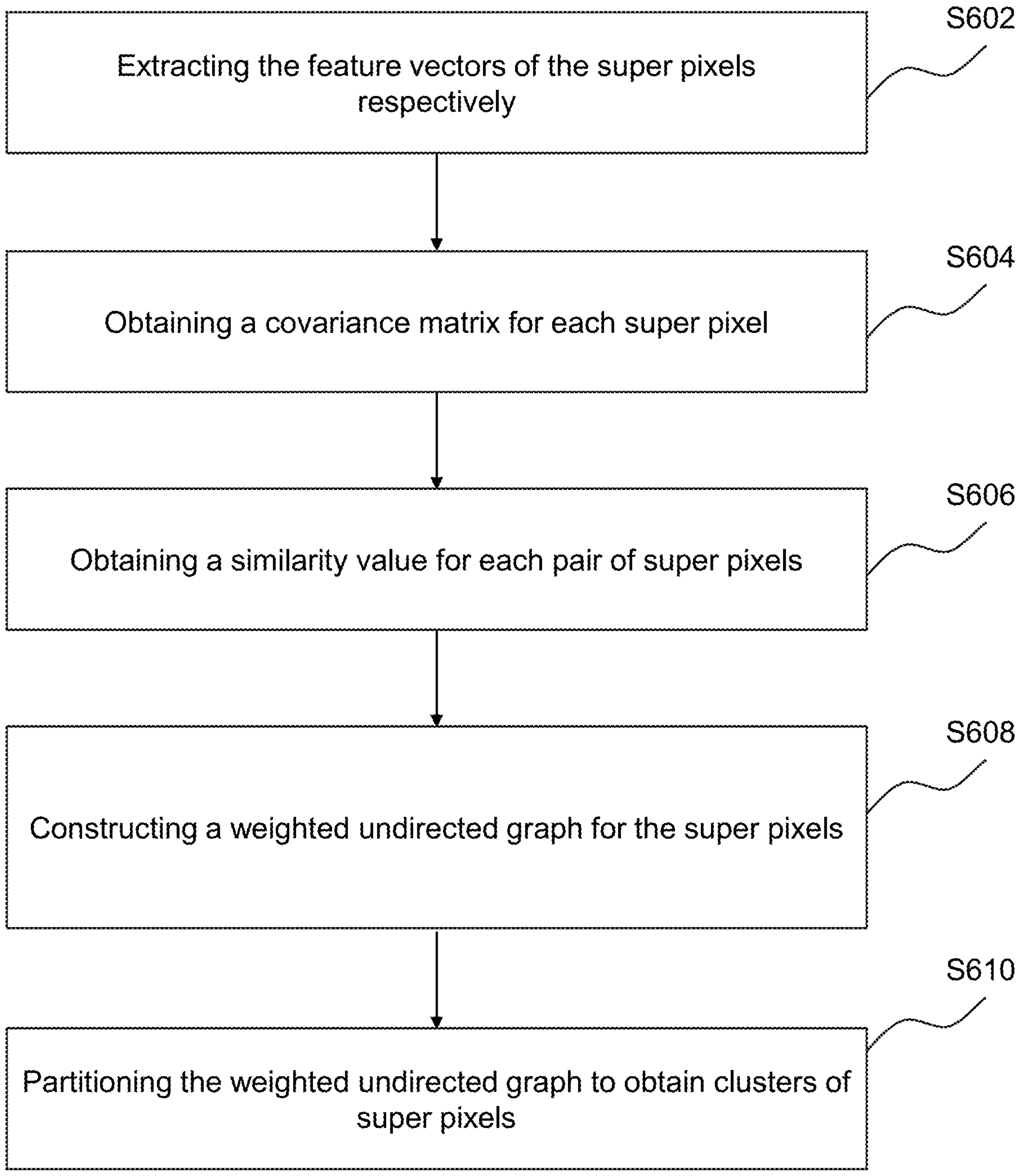
FIG. 6 is a flow chart of super pixel clustering in accordance with one embodiment of the present disclosure.
Figure 7:
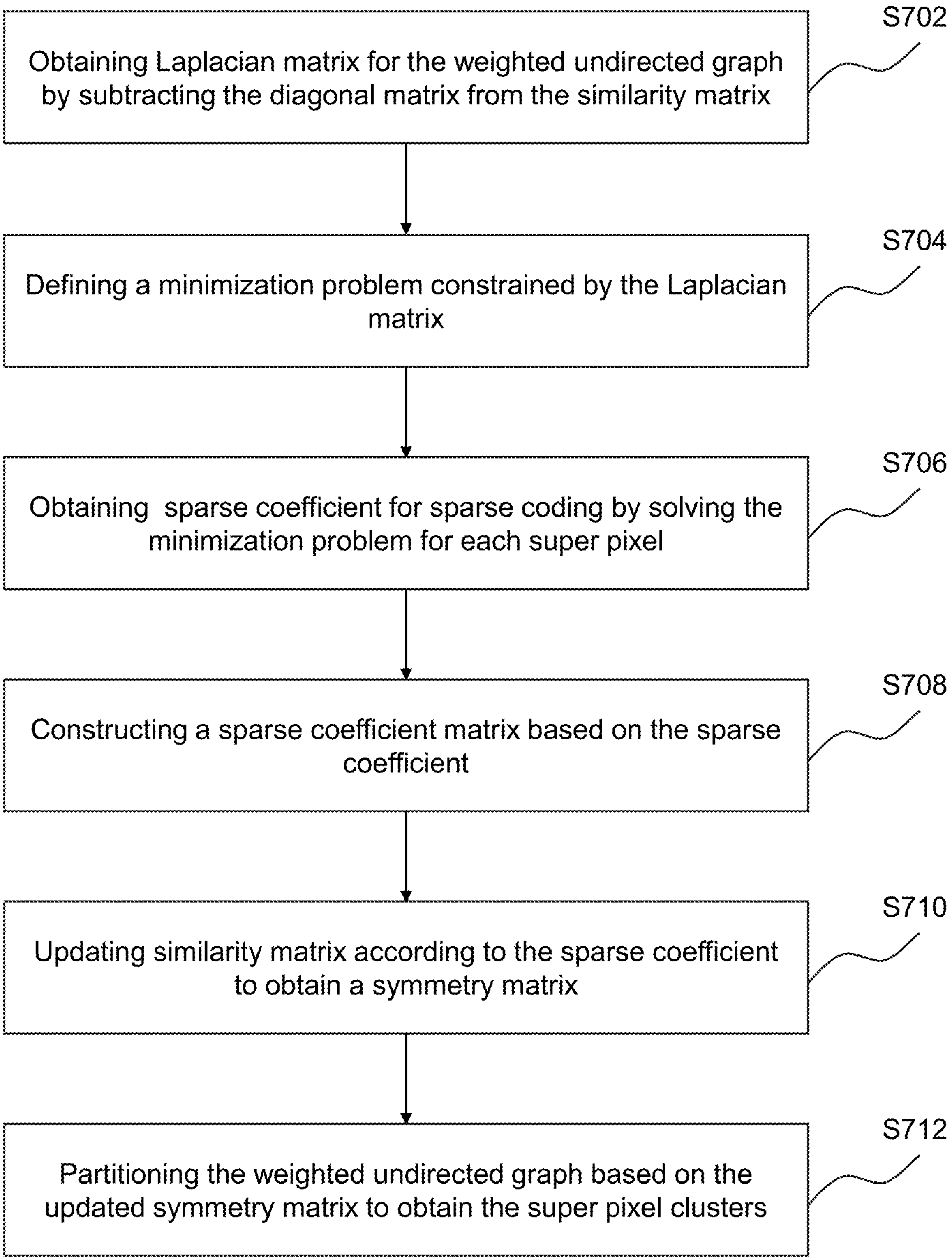
FIG. 7 is a continued flow chart of super pixel clustering in accordance with one embodiment of the present disclosure.

Please refer to FIG. 6 for detailed steps S602-S610 and FIG. 7 for detailed steps of S702-712 of super pixel clustering procedure. At the beginning of performing LSSC algorithm, the feature vectors of the super pixels 110 are extracted respectively. The feature vectors may include color histograms, texture features, gradient features, or any other suitable descriptors that capture the characteristics of the super pixels 110. The feature vectors may be obtained by:

$$u_i = \frac{1}{\Gamma_i}\sum_{j=1}^{\Gamma_i} f_j,\ f_j = [l, a, b, I_X, I_Y, I_Z, I_{XX}, I_{YY}, I_{ZZ}, \beta\times x, \beta\times y, \beta\times z]^T,$$

wherein $u_i$ denotes the feature vector of $i^{th}$ super pixel, $\Gamma_i$ denotes the number of the pixels within $i^{th}$ super pixel, $f_j$ denotes the feature vector of $j^{th}$ pixel, l denotes luminance value in color space, a denotes a-axis which represents the color component from red to green, b denotes b-axis which represents the color component from yellow to blue, $I_X$ denotes first order derivatives of intensity of each pixel along x-axis, $I_Y$ denotes first order derivatives of each pixel along y-axis, $I_Z$ denotes first order derivatives of each pixel along z-axis, $I_{XX}$ denotes second-order derivatives of each pixel along x-axis, $I_{YY}$ denotes second-order derivatives of each pixel along y-axis, $I_{ZZ}$ denotes second-order derivatives of each pixel along z-axis, β denotes the scaling factor, β×x denotes pixel position information along the x-axis, β×y denotes pixel position information along the y-axis, and β×z denotes pixel position information along the z-axis.

Then, a covariance matrix for each super pixel 110 are obtained by:

$$M_i(a, b) = \frac{1}{\Gamma_i - 1} \times \left(\sum_{j=1}^{\Gamma_i} (f_j(a') - u_i(a'')) \times (f_j(b') - u_i(b''))\right).$$

wherein $M_i(a, b)$ denotes covariance matrix element of features a and b in super pixel i.

A similarity matrix between each of the super pixels is calculated to quantify the pairwise similarity between elements in a dataset. The similarity matrix is calculated by:

$$S(r_1, r_2) = Sim_{i_1 i_2} = e^{-0.5\times d_{M_{i2}M_{i1}}},$$

wherein $Sim_{i_1 i_2}$ denotes similarity between two super pixels $i_1$ and $i_2$, $r_1$ and $r_2$ denotes different indexes or identities of the super pixels, $d_{M_{i2}M_{i1}}$ denotes distance or dissimilarity between the feature vectors $M_{i1}$ and $M_{i2}$ of super pixels $i_1$ and $i_2$ respectively, and e denotes the base of the natural logarithm, which is approximately equal to 2.71828.

A diagonal matrix is then calculated to aggregate the similarities of a particular super pixel $r_1'$ with all other super pixels in the multidimensional dataset 100. The diagonal matrix is calculated by:

$$E(r_1', r_1') = \sum_{r_2=1}^{R} S(r_1, r_2)$$

A weighted undirected graph, having R nodes representing the R feature vectors, is constructed. The edges are connected to the nodes. Each edge has a weight representing a similarity value between a pair of nodes connected by the edge. A Laplacian matrix (L matrix) is obtained for the weighted undirected graph by subtracting the diagonal matrix from the similarity matrix. The L matrix encodes the local and global structure of the data. In spectral clustering, the L matrix is used to capture the graph structure of the data, where each super pixel is treated as a node in a graph, and the similarity between super pixels determines the edges' weights. The L matrix can be represented by:

$$L = E - S$$

Then, a minimization problem constrained by the Laplacian matrix is defined. A sparse coefficient for sparse coding may be obtained by solving the minimization problem for each super pixel. The sparse coefficient can be obtained by:

$$\underset{\vartheta_i}{^{argmin}}\|U_i\vartheta_i - u_i\|_2 + \lambda\|\vartheta_i\|_1 + \frac{\eta}{2}\sum_{ii'}\|\vartheta_i - \vartheta_{i'}\|^2 S(i, i') = \underset{\vartheta_i}{^{argmin}}\|U_i\vartheta_i - u_i\|_2 + \lambda\|\vartheta_i\|_1 + \eta tr\left(CLC^T\right)$$

$$\vartheta_i^T e = 1$$

$$\underset{\vartheta_i}{^{argmin}}\|U_i\vartheta_i - u_i\|_2$$

aims to ring $\vartheta_i$ that minimizes the difference between $U_i\vartheta_i$ and $u_i$ while maintaining sparsity. $U_i$ is a linear transformation matrix used to project $\vartheta_i$ into a low-dimensional space, and $u_i$ is the target vector in the low-dimensional space. $\lambda\|\vartheta_i\|_1$ represents the L1 norm of $\vartheta_i$ and $\vartheta_{i'}$ of other data points. L1 norm is a type of vector norm that measures the absolute sum of the components of a vector. In other words, L1 norm of a vector is the sum of the absolute values of its individual components. S(i, i') represents the similarity between i and i' in the similarity matrix. Therefore, the sparse coefficients $\vartheta_i$ are obtained by optimizing the above objective function, which simultaneously considers data reconstruction error, sparsity, and similarity penalties, thus achieving an effective representation of the data.

The sparse coefficient also needs to be transformed to matrix for calculation. The sparse coefficient matrix may be represented as:

$$C = [\vartheta_1, \vartheta_2, \ldots, \vartheta_i, \ldots, \vartheta_R].$$

The similarity matrix is updated according to the sparse coefficient to obtain a symmetry matrix for adjusting the original similarity matrix to better reflect the similarity between data points. Generally, the original similarity matrix may not satisfy symmetry, therefore, by adjusting the original similarity matrix, a new matrix with symmetry, i.e., the symmetry matrix is obtained.

The last step of LSSC algorithm is partitioning the weighted undirected graph based on the updated symmetry matrix to obtain the super pixel clusters 111.

Each of the dictionaries 300 is trained with a corresponding super pixel cluster by: dividing the corresponding super pixel cluster into a plurality of training data sub-blocks, vectorizing the plurality of training data sub-blocks to obtain a plurality of initial representations respectively, calculating a similarity matrix for each pair of training data sub-blocks, computing an average similarity value for each training data sub-block; selecting a plurality of initial training data sub-blocks from the plurality of training data sub-blocks based on the based on the computed average similarity values, initializing the dictionary by setting the initial training data sub-blocks as initial atoms of the dictionary, training the dictionary to construct a sparse coding representation for each of the training data sub-blocks by performing a batch orthogonal matching pursuit (batch OMP) algorithm constrained with a target sparsity and a target residual threshold; and updating the dictionary atom by atom with the constructed sparse coding representations to obtain a trained dictionary.

Specifically, the batch OMP algorithm is performed iteratively to construct a sparse coding representation for each training data sub-block by: a) computing a gram matrix of the dictionary; b) computing a correlation vector of the dictionary with respect to the data sub-block, where each element of the correlation vector corresponds to correlation between an atom of the dictionary and the data sub-block; c) finding the best-matched atom of the dictionary having the maximum correlation with the data sub-block; d) applying Cholesky decomposition to a sub-set of the gram matrix containing index of the best-matched atom to obtain a Cholesky decomposition result; e) solving for the sparse coding representation using the Cholesky decomposition result; f) updating the correlation vector by subtracting a product of the sparse coding representation and the gram matrix; g) multiplying the dictionary with the sparse coding representation to obtain a reconstructed signal; and h) updating a residual between the reconstructed signal and the training data sub-block. If the target sparsity is not reached or the updated residual is greater than the target residual threshold, the above steps (c) to (h) are repeated. If the target sparsity is reached or the updated residual is smaller than the target residual threshold, the sparse coding representation for the training 2D/3D data sub-block is output for further operation.

In one exemplary implementation of the batch OMP, a dictionary is denoted as $\Phi$, a signal (or data sub-block) is denoted as y, a gram matrix $G=\Phi^T\Phi$, initial correlation vector $\overline{h}^0=\Phi^T\overline{y}$, squared norm $\in^0$ of the signal $\overline{y}$ are constructed on basis of an upper bound on the desired sparsity level K, and residual norm (squared) threshold $\in$. Before iteration, an index vector I is initialized to be an empty vector, a lower triangular matrix obtained from Cholesky decomposition, L is initialized to be filled with one (i.e. a unity vector), an initial sparse representation vector $\overline{\gamma}$ with all zero, and a supporting vector (or correlation vector) $\overline{h}=\overline{h}^0$ are also initialized. In each iteration n, set k to be the maximum index of $\overline{h}$. When n is greater than one, Cholesky decomposition is carried out on the sub matrix of G containing the atom index, denoted as $G_{I,I}$, the result of which is used to update L. After that, the Cholesky decomposition result at the stored atom index is used to solve for the sparse representation vector $\gamma$. That is, I is updated by appending k.

The elements of sparse representation vector $\bar{\gamma}$ at indices given in I, $\bar{\gamma}_I$, is set to be that is $$(LL^T)^{-1}\overline{h_I^0},$$

that is $$\bar{\gamma}_I = (LL^T)^{-1}\overline{h_I^0}.$$

Further, $\bar{h}$ is updated with $\overline{h^0}-G_I\bar{\gamma}_I$, that is $\bar{h}=\overline{h^0}-G_I\bar{\gamma}_I$. An updated residual is also calculated/updated with $\Sigma^n=(\bar{y}-\Phi\bar{\gamma})^T(\bar{y}-\Phi\bar{\gamma})=\epsilon^{n-1}-\delta^n+\delta^{n-1}$, where $\Phi\bar{\gamma}$ is the reconstructed signal, $\delta^n$ and $\delta^{n-1}$ equals to $$\bar{\gamma}_I^T G_I \bar{\gamma}_I$$

for the n the iteration and n−1 th iteration respectively. The above iteration repeats when number of non-zero elements of $\bar{\gamma}$ is less than K or the updated residual is greater than the norm residual threshold.

Figure 8:
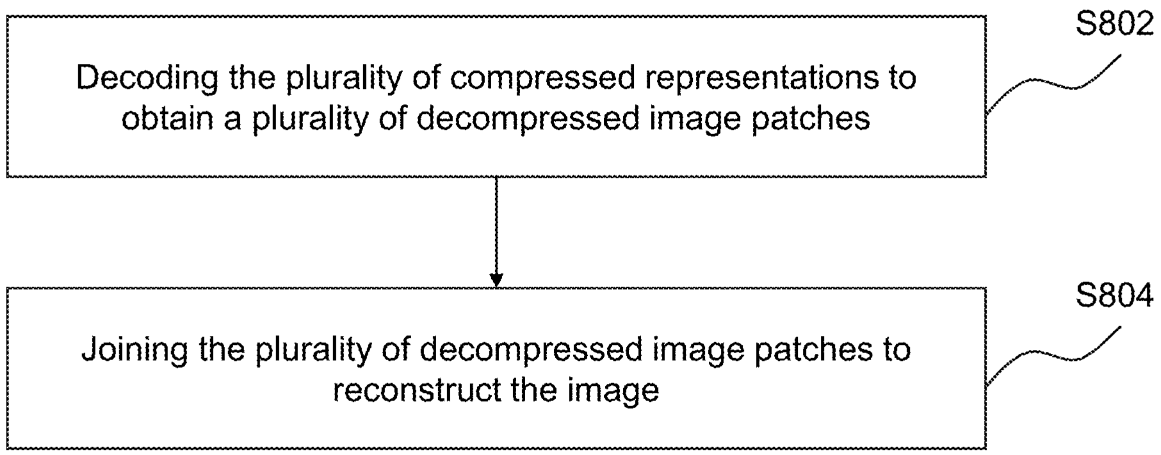
FIG. 8 is a flow chart of method for decompressing multidimensional data in accordance with one embodiment of the present disclosure

The method for decompressing multidimensional data 100 from the compressed file includes steps S802-S804 as shown in FIG. 8. In details, the plurality of compressed representations in the compressed file is decoded to obtain a plurality of decompressed data sub-blocks. Then the plurality of decompressed data sub-blocks are joined to reconstruct the multidimensional data.

Specifically, each decompressed data sub-block is obtained by: retrieving a corresponding dictionary based on a corresponding index: multiplying the compressed representations with the retrieved dictionary to reconstruct a vectorized data sub-block, and de-vectorizing the reconstructed vectorized data sub-block to obtain the decompressed data sub-block.

The embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention may also be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A computer-implemented method including a compression process for compressing multidimensional data having a plurality of data points stored in a memory into a compressed file and a decompression process for decompressing the multidimensional data from the compressed file, the compression process comprising:

receiving, by a processor, the multidimensional data;

generating a plurality of super pixels from the multidimensional data;

clustering the plurality of super pixels into a plurality of super pixel clusters;

using the plurality of super pixel clusters to train a plurality of dictionaries respectively, each dictionary corresponding to a respective super pixel cluster;

splitting the multidimensional data into a plurality of data sub-blocks corresponding to localized regions of the multidimensional data;

vectorizing the plurality of data sub-blocks to obtain a plurality of vectorized data sub-blocks;

selecting a dictionary for each of the vectorized data sub-blocks from the plurality of dictionaries;

sparse coding each of the vectorized data sub-blocks with a corresponding selected dictionary to obtain a compressed representation; and storing the obtained compressed representations and indexes of corresponding selected dictionaries in the compressed file such that, for each vectorized data sub-block, the compressed file stores the compressed representation together with an index identifying the corresponding selected dictionary;

wherein each dictionary is selected for a corresponding vectorized data sub-block by:

calculating a similarity between the corresponding vectorized data sub-block and each of the super pixel clusters;

finding a best-matched super pixel cluster having a highest similarity with the vectorized data sub-block; and selecting a dictionary trained with the best-matched super pixel cluster as the coding dictionary;

wherein each dictionary is trained with a corresponding super pixel cluster by:

dividing the corresponding super pixel cluster into a plurality of training data sub-blocks;

vectorizing the plurality of training data sub-blocks to obtain a plurality of initial representations respectively;

calculating a similarity matrix between each pair of training data sub-blocks;

computing an average similarity value for each training data sub-block;

selecting a plurality of initial training data sub-blocks from the plurality of training data sub-blocks based on the computed average similarity values;

initializing the dictionary by setting the initial training data sub-blocks as initial atoms of the dictionary;

training the dictionary to construct a sparse coding representation for each of the training data sub-blocks by performing a batch orthogonal matching pursuit (batch OMP) algorithm constrained with a target sparsity and a target residual threshold; and updating the dictionary atom by atom with the constructed sparse coding representations to obtain a trained dictionary;

wherein the plurality of super pixels is generated by:

initializing a plurality of super pixel centers with a maximum interval; and updating locations of the plurality of super pixel centers by:

(a) defining a plurality of overlapped super pixel regions centered by and corresponding to the plurality of super pixel centers respectively, each cluster region having a size equal to two times of the maximum interval of the super pixel centers;

(b) for each multi-dimensional data point: calculating, within each corresponding overlapped super pixel regions, a plurality of distances of a plurality of neighboring super pixel centers from the multi-dimensional data point; and assigning the multi-dimensional data point to a super pixel region containing a nearest neighboring super pixel that has a shortest distance from the multi-dimensional data point;

(c) updating, for each super pixel center, a current location of the super pixel center to a centroid position of all multi-dimensional data points assigned to the corresponding super pixel region;

(d) calculating, for each super pixel center, a residual value between the updated location and the current location for each super pixel center;

(e) repeating steps (b) to (d) if any one of the residual values is greater than a threshold value; and (f) outputting the updated location as the current location of the super pixel center if all of the residual values are equal or smaller than the threshold value; and the decompression process comprising:

decoding the plurality of compressed representations to obtain a plurality of decompressed data sub-blocks; and joining the plurality of decompressed data sub-blocks to reconstruct the multidimensional data;

wherein each decompressed data sub-block is obtained by:

retrieving a corresponding selected dictionary based on a corresponding stored index;

multiplying the compressed representations with the retrieved corresponding selected dictionary to reconstruct a vectorized data sub-block; and de-vectorizing the reconstructed vectorized data sub-block to obtain the decompressed data sub-block.

2. The method according to claim 1, wherein the batch OMP algorithm is performed to construct a sparse coding representation for each training data sub-block by:

(a) computing a gram matrix of the dictionary;

(b) computing a correlation vector of the dictionary with respect to the data sub-block, where each element of the correlation vector corresponds to correlation between an atom of the dictionary and the data sub-block;

(c) finding the best-matched atom of the dictionary having the maximum correlation with the data sub-block;

(d) applying Cholesky decomposition to a sub-set of the gram matrix containing index of the best-matched atom to obtain a Cholesky decomposition result;

(e) solving for the sparse coding representation using the Cholesky decomposition result;

(f) updating the correlation vector by subtracting a product of the sparse coding representation and the gram matrix;

(g) multiplying the dictionary with the sparse coding representation to obtain a reconstructed signal;

(h) updating a residual between the reconstructed signal and the training data sub-block;

(i) if the updated residual is greater than the target residual threshold, repeating steps (c) to (h); and (j) if the target sparsity is reached or the updated residual is smaller than the target residual threshold, outputting the sparse coding representation for the training data sub-block for further operation.

3. The method according to claim 1, wherein, the distance of a neighboring super pixel center to a multi-dimensional data point is calculated on basis of a color distance and a spatial distance between neighboring super pixel center to an image pixel.

4. The method according to claim 3, wherein the plurality of super pixels is clustered by performing a Laplacian sparse subspace clustering algorithm; and the Laplacian sparse subspace clustering algorithm is performed by:

extracting a plurality of feature vectors for the plurality of super pixels respectively;

obtaining a covariance matrix for each super pixel;

obtaining a similarity value for each pair of super pixels;

constructing a weighted undirected graph having a plurality of nodes representing the plurality of feature vectors, edges connecting the nodes; wherein each edge has a weight representing a similarity value between a pair of nodes connected by the edge;

partitioning the weighted undirected graph to obtain a plurality of clusters of super pixels.

5. The method according to claim 4, wherein the feature vector of each super pixel is an average of feature vectors of all pixels within the super pixel.

6. The method according to claim 5, wherein a covariance matrix $M_i$ of a super pixel $C_i$ is given by:

$$Mi(a,b) = \frac{1}{ri-1} * \left(\sum_{j=1}^{ri} (fj(a') - ui(a'')) * (fj(b') - ui(b'))\right)$$

where $M_i(a,b)$ denotes covariance matrix elements of features a and b in super pixel i, $f_i$ and $u_i$ are the pixel feature vector and mean feature vector within the super pixel j, $f_j(a')$ denotes the a'th element of the feature vector and $u_i(a'')$ denotes the a"th element of the mean feature vector, f; (b') denotes the b'th element of the feature vector and $u_i(b'')$ denotes the b"th element of the mean feature vector.

7. The method according to claim 6, wherein the similarity value for a super pixel $i_1$ and a super pixel $i_2$ is calculated on basis of a distance between feature vectors of the super pixels $i_1$ and $i_2$.

8. The method according to claim 7, wherein the weighted undirected graph is partitioned by:

obtaining a Laplacian matrix for the weighted undirected graph;

defining a minimization problem constrained by the Laplacian matrix;

solving the minimization problem for each super pixel to obtain a sparse coefficient for the super pixel;

constructing a sparse coefficient matrix for the R subpixel super pixels;

updating a symmetry matrix with the sparse coefficient matrix;

partitioning the weighted undirected graph based on the updated symmetry matrix.

9. The method according to claim 8, the minimization problem is defined with the sparse coefficient, a linear transformation matrix used to project the sparse coefficient into a low-dimensional space, a target vector in the low-dimensional space, and L1 norm of the sparse coefficient and sparse coefficients of other data points.

* * * * *